United States Patent
Tice

(10) Patent No.: US 6,229,439 B1
(45) Date of Patent: *May 8, 2001

(54) SYSTEM AND METHOD OF FILTERING

(75) Inventor: Lee D. Tice, Bartlett, IL (US)

(73) Assignee: Pittway Corporation, St. Charles, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/294,932

(22) Filed: Apr. 19, 1999

Related U.S. Application Data

(63) Continuation-in-part of application No. 09/120,444, filed on Jul. 22, 1998, now Pat. No. 5,969,604.

(51) Int. Cl.⁷ .................................................. G08B 29/00
(52) U.S. Cl. ........................ 340/506; 340/510; 340/511; 340/588; 340/522; 340/628; 340/577
(58) Field of Search ..................................... 340/506, 514, 340/510, 511, 588, 589, 517, 521, 522, 628, 632, 501, 577, 600, 601

(56) References Cited

U.S. PATENT DOCUMENTS

| | | | |
|---|---|---|---|
| 3,922,656 | 11/1975 | Horvath et al. | 340/522 |
| 4,088,986 | 5/1978 | Boucher | 340/521 |
| 4,093,867 | 6/1978 | Shah et al. | 250/576 |
| 4,186,390 | 1/1980 | Enemark | 340/630 |
| 4,470,047 | 9/1984 | Vogt et al. | 340/511 |
| 4,490,715 | 12/1984 | Kusanagi et al. | 340/632 |
| 4,525,704 | 6/1985 | Campbell et al. | 340/632 |
| 4,575,711 | 3/1986 | Suzuki et al. | 340/521 |
| 4,638,304 | 1/1987 | Kimura et al. | 340/511 |
| 4,640,628 | * 2/1987 | Seki et al. | 340/628 |
| 4,644,331 | 2/1987 | Matsushita et al. | 340/587 |
| 4,667,106 | 5/1987 | Newman | 250/382 |
| 4,688,021 | 8/1987 | Buck et al. | 340/521 |
| 4,697,172 | 9/1987 | Kimura | 340/587 |
| 4,749,986 | 6/1988 | Otani et al. | 340/587 |
| 4,749,987 | 6/1988 | Ishii | 340/587 |
| 4,763,115 | 8/1988 | Cota | 340/628 |
| 4,803,469 | 2/1989 | Matsushita | 340/577 |
| 4,831,361 | 5/1989 | Kimura | 340/506 |
| 4,833,450 | 5/1989 | Buccola et al. | 340/506 |
| 4,871,999 | * 10/1989 | Ishii et al. | 340/587 |
| 4,884,222 | 11/1989 | Nagashima et al. | 340/506 |
| 4,975,684 | 12/1990 | Guttinger et al. | 340/522 |
| 5,005,003 | 4/1991 | Ryser et al. | 340/587 |
| 5,026,992 | 6/1991 | Wong | 250/343 |
| 5,053,754 | 10/1991 | Wong | 340/632 |
| 5,079,422 | 1/1992 | Wong | 340/577 |
| 5,100,479 | 3/1992 | Wise et al. | 136/225 |
| 5,103,096 | 4/1992 | Wong | 250/343 |

(List continued on next page.)

FOREIGN PATENT DOCUMENTS

| | | |
|---|---|---|
| 2 225 456 | 5/1990 | (GB) . |
| 2 252 191 | 7/1992 | (GB) . |
| 2 289 074 | 8/1995 | (GB) . |
| 2301921 | 12/1996 | (GB) . |
| 2 305 760 | 4/1997 | (GB) . |
| 2 311 158 | 9/1997 | (GB) . |

*Primary Examiner*—Donnie L. Crosland
(74) *Attorney, Agent, or Firm*—Rockey, Milnamow & Katz, Ltd.

(57) ABSTRACT

An ambient condition detector includes at least a sensor for a first ambient condition and a second, sensor which is responsive to a second ambient condition not necessarily correlated to the first condition. Control circuitry, coupled to both sensors, processes an output from the first sensor to reduce transients and/or noise therein which are not correlated to the first ambient condition. Processing characteristics are altered in response to an output from the second sensor. The processing can take place at the detector or, in part, at the detector and, in part, at a displaced, common control element. The output from the first sensor can also be used to modify the processing of the output of the second sensor.

46 Claims, 9 Drawing Sheets

U.S. PATENT DOCUMENTS

| | | | |
|---|---|---|---|
| 5,159,315 | 10/1992 | Schultz et al. | 340/539 |
| 5,163,332 | 11/1992 | Wong | 356/437 |
| 5,168,262 | 12/1992 | Okayama | 340/523 |
| 5,218,440 | 6/1993 | Mathur | 358/213.27 |
| 5,227,972 | 7/1993 | Jacobson | 702/8 |
| 5,276,434 | 1/1994 | Brooks et al. | 340/632 |
| 5,282,261 | 1/1994 | Skeirik | 706/23 |
| 5,341,214 | 8/1994 | Wong | 356/437 |
| 5,369,397 | 11/1994 | Wong | 340/632 |
| 5,376,924 | 12/1994 | Kubo et al. | 340/632 |
| 5,526,280 | 6/1996 | Consadori et al. | 340/632 |
| 5,592,147 | 1/1997 | Wong | 340/522 |
| 5,612,674 | 3/1997 | Tice | 340/517 |
| 5,659,292 | 8/1997 | Tice | 340/522 |
| 5,691,703 * | 11/1997 | Roby et al. | 340/628 |
| 5,767,776 | 6/1998 | Wong | 340/522 |
| 5,798,700 | 8/1998 | Wong | 340/522 |
| 5,801,633 | 9/1998 | Soni | 340/521 |
| 5,969,604 * | 10/1999 | Tice | 340/506 |

\* cited by examiner

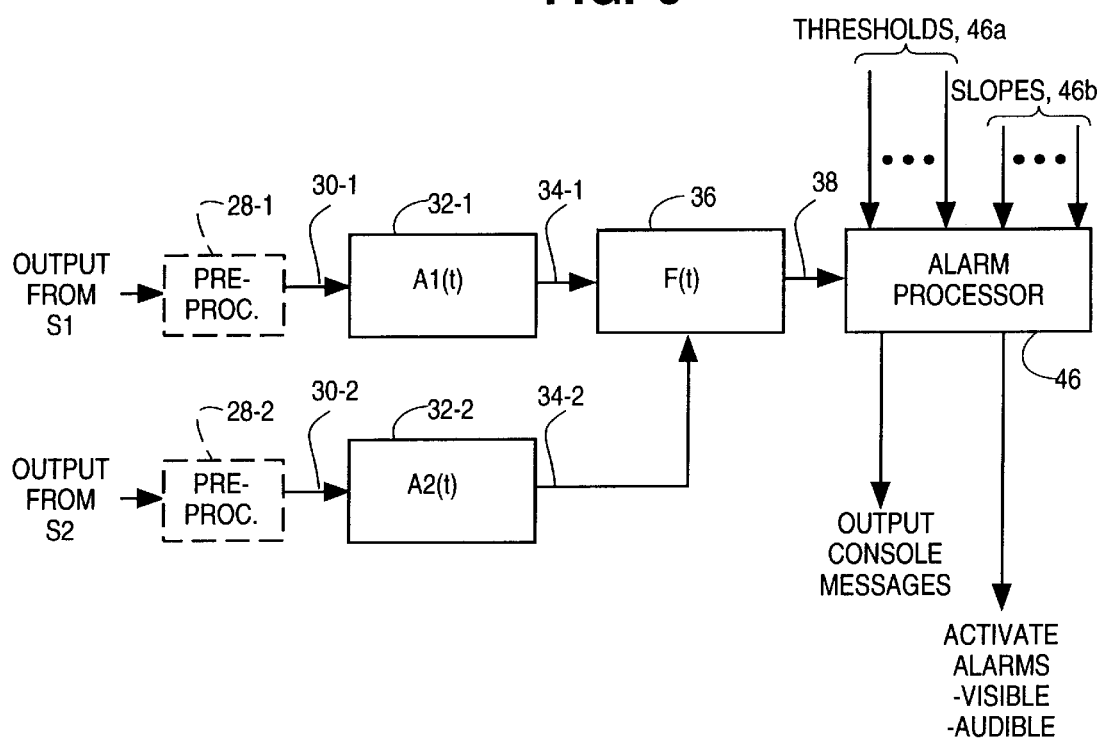

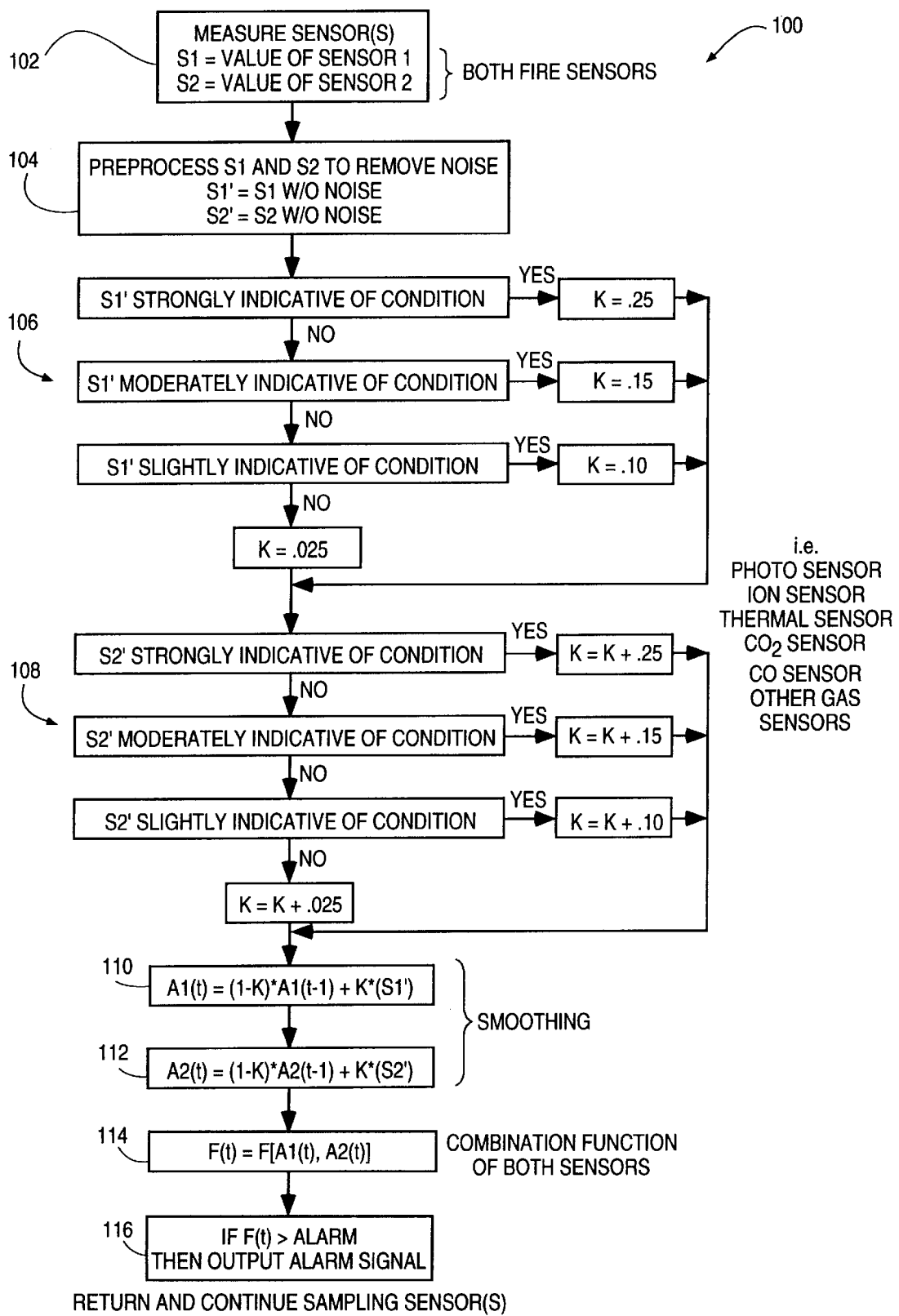

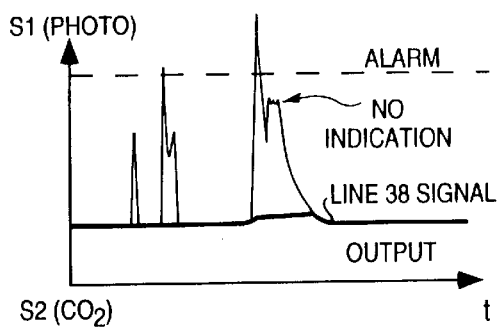
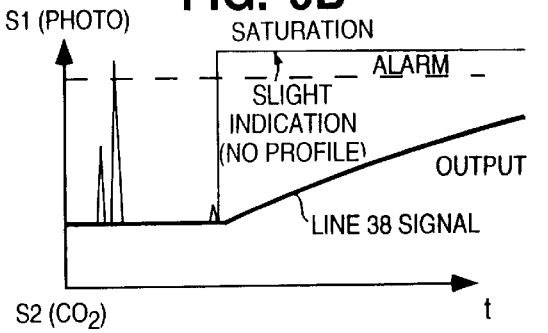
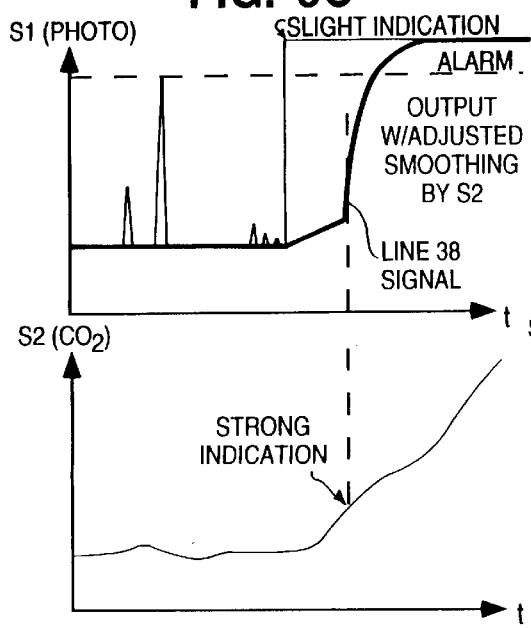
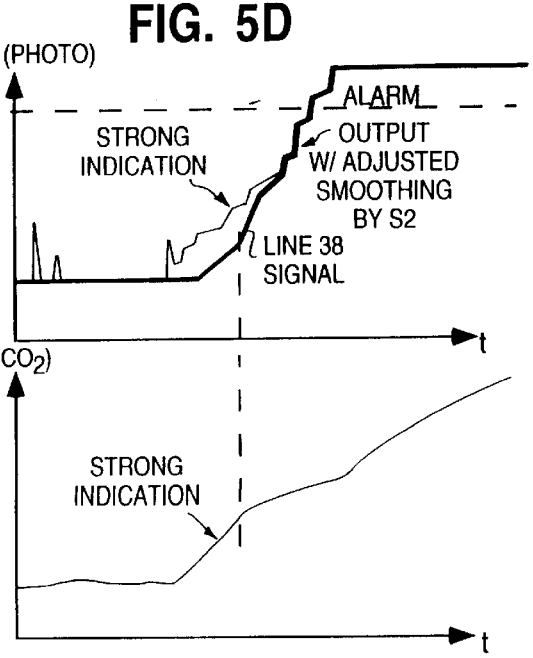

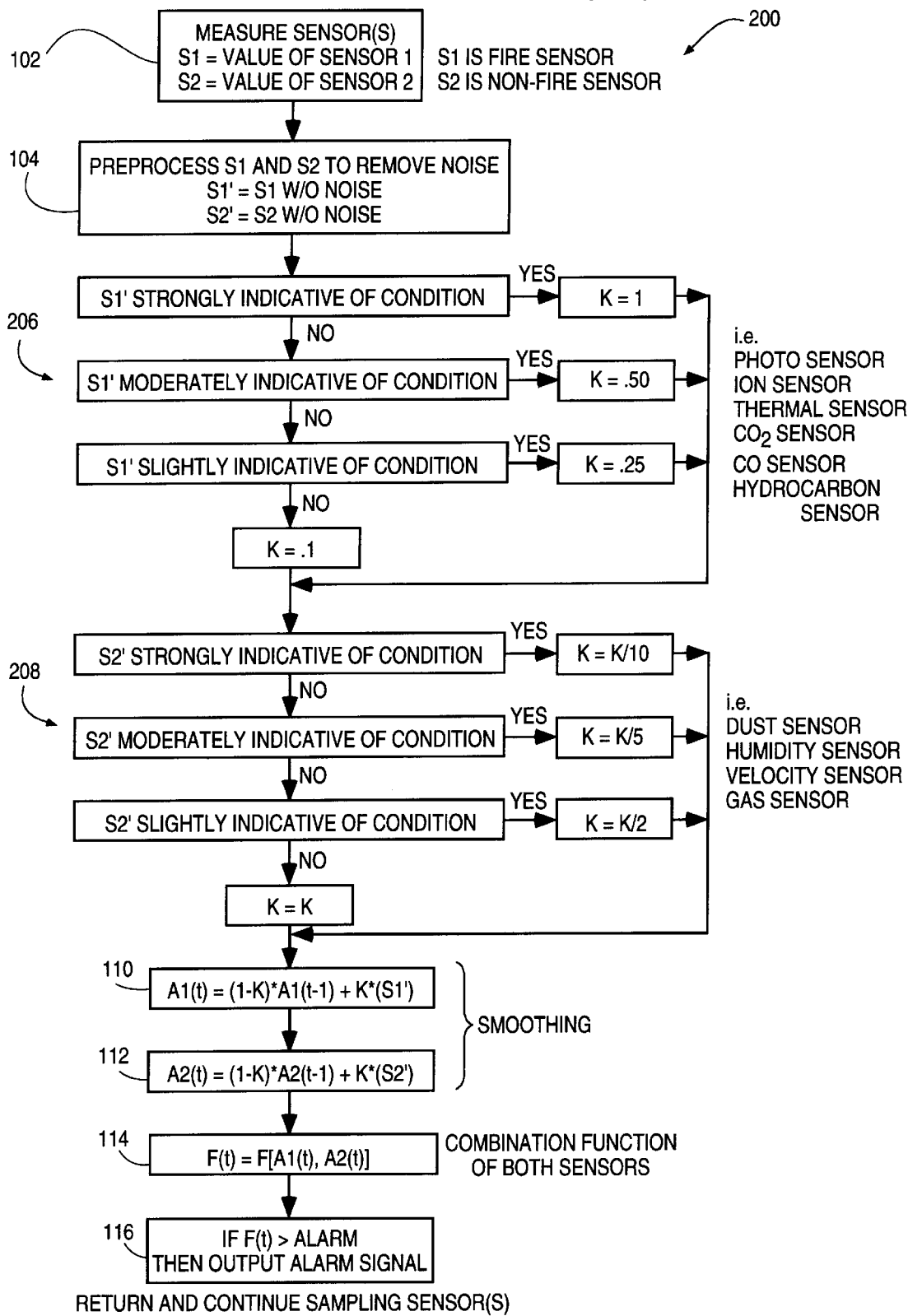

FIG. 7A
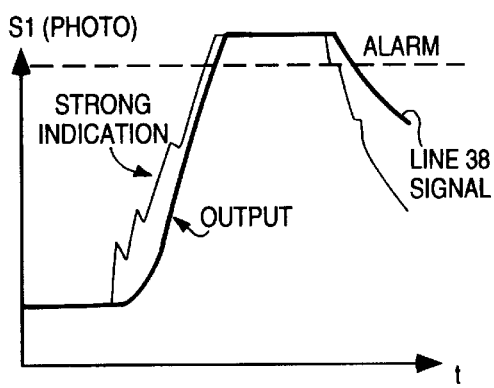
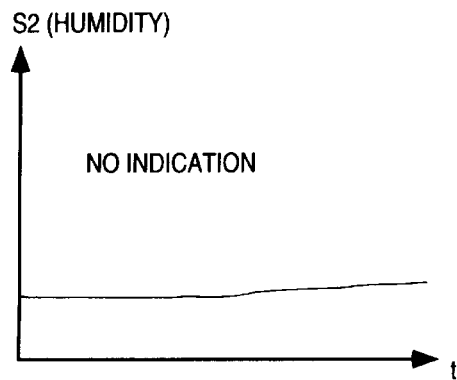
FIG. 7B
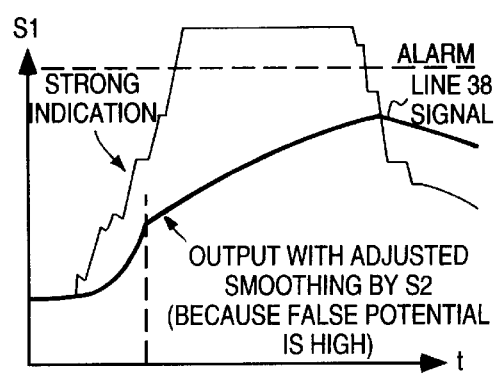
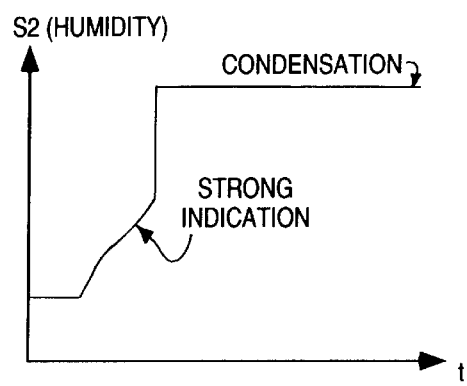

SYSTEM AND METHOD OF FILTERING

This application is a continuation-in-part of U.S. patent application Ser. No. 09/120,444, entitled System And Method Of Adjusting Smoothing and filed Jul. 22, 1998 U.S. Pat. No. 5,969,604.

FIELD OF THE INVENTION

The invention pertains to ambient condition detectors. More particularly, the invention pertains to such detectors which incorporate variable smoothing of signals indicative of an ambient condition.

BACKGROUND OF THE INVENTION

Distributed fire alarm systems which incorporate a plurality of ambient condition detectors, such as smoke, heat or gas detectors, are often installed in business or commercial buildings. Such systems often have a common control unit which can be in either unidirectional or bidirectional communication with multiple, spatially separated, ambient condition detectors.

One of the problems associated with transmission of information to or from such detectors is the presence of uncorrelated noise. Noise is uncorrelated wherein it is not related to a selected parameter or parameters which is/are being monitored.

In the event that the parameter being monitored is a level of ambient smoke, an ambient temperature, or a level of an ambient gas, the signals of interest are those which have a high correlation to the particular ambient condition being detected. Other signals, due to electrical or thermal noise which are not correlated to the ambient condition being detected, and which may in fact be random, are undesirable. Various techniques have been used in the past to minimize the effects of such uncorrelated noise signals.

One known type processing or filtering involves sampling the signals from at least one of the ambient condition detectors and calculating a running average based on a predetermined number of prior sample values, such as 6 or 8 or 10, along with the latest sample value. As each new sample value is received, the running average is updated. This technique provides a vehicle for minimizing or suppressing the effects of uncorrelated noise. This process can also be carried out continuously using analog circuits.

Filters can be implemented using analog or digital hardware. Alternately, they can be implemented digitally in software. One such system is described in U.S. Pat. No. 5,612,674 entitled High Sensitivity Apparatus and Method With Dynamic Adjustment for Noise assigned to the Assignee hereof and incorporated by reference herein.

While known approaches do provide a vehicle for suppressing or reducing uncorrelated noise in signals from ambient condition detectors, they also introduce delays. In the event that the parameter of interest, such as level of smoke or ambient temperature, does start to increase, the increases are attenuated and only appear in the output filtered signals after a delay interval which is characteristic of the type of averaging or filtering which is used.

As disclosed and claimed in the parent hereto, hereby incorporated by reference, a smoothing or filtering function can be altered in the presence of a fire indicating profile. It would be desirable to be able to start to adjust the degree of smoothing or filtering even before a fire indicating profile can be detected.

SUMMARY OF THE INVENTION

An apparatus in accordance with the present invention incorporates at least first and second ambient condition sensors. For example, and without limitation, a first sensor can be responsive to ambient smoke while a second sensor can be responsive to gas such as carbon monoxide or carbon dioxide or other hydrocarbons. The second sensor could alternately be responsive to temperature.

Control circuitry processes an output from the first sensor by filtering or smoothing same to reduce transients and or noise therein not correlated with the ambient condition to which the first sensor responds. The smoothing or filtering characteristics are then altered in response to an output from the second sensor. The control circuitry can be located adjacent to the sensors. Alternately, the control circuitry can, in part, be adjacent to the sensors and, in part, remote therefrom.

If both sensors are fire sensors, then one fire sensor could be used to control the response of the other fire sensor. Alternately, they effectively can interact by setting smoothing coefficients of each other.

If one sensor is a fire sensor and another is a non-fire sensor, then the non-fire sensor can be used to control the response of the fire sensor by slowing down its response. For example, the fire sensor may be responding to a false condition such as dust or humidity. Hence, if the first sensor responds to smoke (ion or photo-type sensor), the second could respond to gas, dust, temperature or humidity.

This is a combination detector where two or more sensors are logically combined in a detector to determine if a specific ambient condition exists. This ambient condition may be a fire, for example.

By controlling the smoothing coefficient, the detector is not prevented from alarming if a condition prevails long enough. It tends to be fail safe. The smoothing coefficient simply controls the rate of response and the development of a condition profile at any time will immediately increase the response from a non-profile condition because the detector stays active.

A method in accordance with the invention uses one or more of the sensors to establish at least one smoothing coefficient for another one or more of the sensors. The multiple sensors are used to improve the recognition of a condition or the absence of that condition in order to provide a faster response to the condition or a slower response to false conditions to prevent unwanted alarms.

Filter altering outputs from the respective sensors can be evaluated by amplitude, rate-of-change, or other means to determine if the condition is present. Processing can be carried out locally at the respective detector or remotely at a common control unit. In the latter instance, the coefficient(s) could be downloaded after having been modified if filtering is to be carried out at the detector.

The indication of a fire can be categorized or continuously based upon the sensor output values and evaluation of the values. For example, the indications can be categorized into:

No indication (there is no pattern or trend);

Slight indication (there is no pattern but a trend is started or there is a sharp increase to saturation);

Moderate indication (there is a pattern but significant doubt still exists about the condition); and Strong indication (there is a specific pattern and little doubt exists about the condition).

Multiple sensors provide additional information beyond that available from a single sensor. As a result, a condition signature can be established to increase confidence that an actual fire condition is developing. This method is not limited to two sensors but can also include three or more.

Various types of filtering can be used and modified without departing from the spirit and scope of the present invention. For example, running averages can be used and dynamically modified in response to the output of the appropriate sensor.

The entire process can be carried out locally at each respective detector. Alternately, part of the processing can be carried out at the detector and part at a common control unit.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 3 is a block diagram illustrating an apparatus and a process for altering a smoothing or fitting process in accordance herewith;

FIG. 4 is a flow diagram of processing in accordance herewith where both sensors are responsive to parameters indicative of fire;

FIGS. 5A–5D illustrates detector response to various conditions;

FIG. 6 is a flow diagram of processing in accordance herewith where a first sensor is responsive to a parameter indicative of fire and a second sensor is a non-fire sensor;

FIGS. 7A, 7B illustrate detector response to various conditions;

DETAILED DESCRIPTION OF THE PREFERRED EMBODIMENTS

Figure 1:
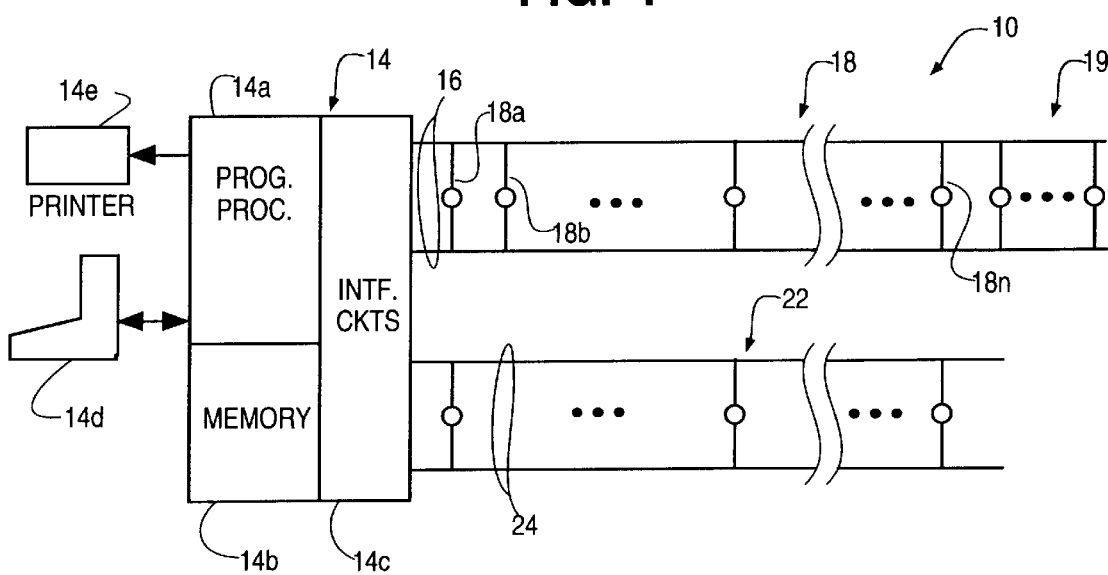
FIG. 1 is a block diagram of a system in accordance with the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

FIG. 1 illustrates an alarm system 10 which incorporates a common control unit 14. The system 10 could, for example, be part of a more extensive building control system. It could also include a plurality of linked control units. 14.

The control unit 14 can further include a programmable processor 14a, associated memory 14b and interface circuitry 14c. The interface circuitry coupled the processor 14a, via a communication link 16 to a plurality of ambient condition detectors 18.

The link can be unidirectional or bidirectional. The link can be implemented using for example, cable, optically conductive fiber or any other wired or wireless link such as RF.

The members of the plurality 18, 18a, 18b . . . 18n each include one or more ambient condition fire sensors S1 such as smoke sensors, flame sensors, gas sensors or heat sensors. At least some of the members of the plurality 18 include a second ambient condition sensor S2. The sensors S2 can correspond to fire sensors, or non-fire sensors such as dust, humidity or velocity sensors.

The members of the plurality 18 communicate with the processor 14a, via the communications link 16. Signals, indicative of the sensed ambient conditions for each respective detector can be transmitted to unit 14. The signals can be analog or digital form without limitation.

A plurality of function generating output modules 19 is also coupled to the link. Modules 19 can be commanded to activate solenoids or other types of output devices as desired.

Processor 14a, in response to processing modules and instructions stored in memory 14b processes the returned ambient condition signals or indicators from one or more of the detectors in the plurality 18. In the presence of a predetermined alarm condition, a plurality of audible and/or visual alarm output devices 22 can be energized, via communication link 24, to thereby provide both visual and audible indicators of an alarm condition in the region being monitored.

An operator's counsel 14d can be used to provide a visual indication to an operator of an alarm condition. Alternately, alarm or related conditions can be logged in a printer 14e.

The indicators from the detectors 18 can be filtered or smoothed to minimize the effects of uncorrelated noise. The degree of smoothing can be varied in response to the probability of a fire being present.

In the presence of random variations in the indicators being received from the members of the plurality 18, characteristic of uncorrelated noise, a high level of filtering or smoothing can be implemented. This in turn limits the response time of the system.

Filtering or smoothing can be implemented in the control unit 14. Alternately, it can be implemented in one or more distributed devices 18 including smoke detectors, fire detectors, gas detectors or the like without limitation.

If on the other hand the indicators from the detectors 18 correspond to a fire profile, then the processor 14a can respond by either reducing or bypassing the level of smoothing or filtering thereby providing faster system response time.

As described below, the filtering or smoothing process can be carried out in hard-wired circuitry. Alternately, the process can be carried out by the execution of pre-stored instructions in the form of a control program stored in the memory 14b or at the respective detector. The prestored instructions can be executed to implement single or multiple stage exponential-like filtering or smoothing functions as well as to carry out software based alarm processing.

If desired, the raw signals or indicators from the detectors can be pre-filtered or pre-processed in accordance with the system described in U.S. patent application Ser. No. 08/522, 599 filed Sep. 1, 1995, entitled "Pre-Processor Apparatus and Method," assigned to the assignee hereof and incorporated by reference herein. Other forms of preprocessing can be used without limitation.

Figure 2:
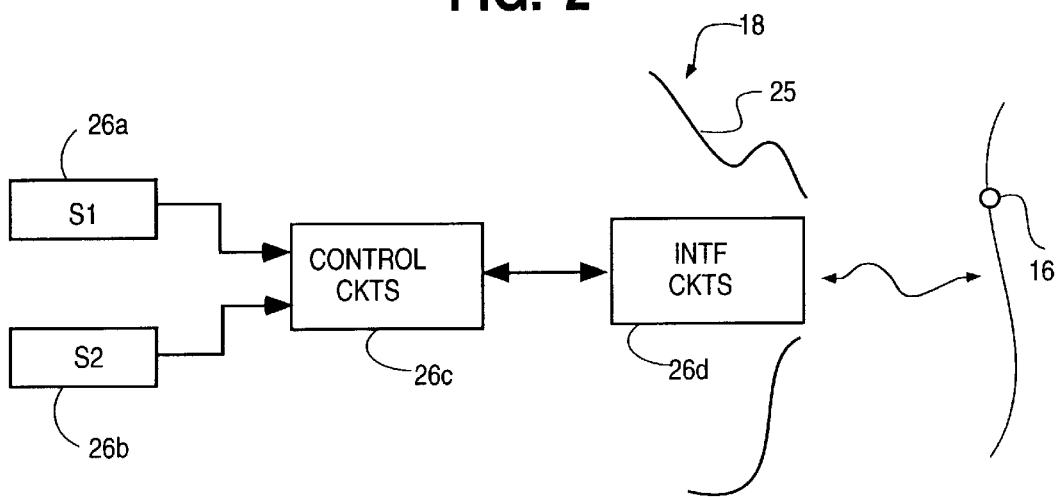
FIG. 2 is a block diagram of a multiple sensor detector usable in the system of FIG. 1.

By way of example, and without limitation, a representative dual sensor detector, such as detector 18a, is illustrated in FIG. 2. The detector 18a includes a housing 25 which carries a first sensor 26a and a second sensor 26b. The sensors 26a and 26b are coupled to the local detector control circuitry 26c.

It will be understood that the processing described subsequently can be carried out by control circuitry 26c at the respective detector, or alternately at the control unit 14 without limitation. Control circuitry 26c could be implemented, at least in part, with a programmed processor and local control instructions.

Control circuitry 26c is in bidirectional communication with interface circuitry 26d. Interface circuitry 26b is in turn coupled to the communications link 16 so as to place the detector 18a in bidirectional communication with control unit 14.

It will be understood that ambient condition sensor S1, 26a, could be implemented as a sensor responsive to a potential fire condition. Such sensors include smoke sensors, flame sensors, thermal sensors, and gas sensors.

The second ambient condition sensor S2, 26b, could be implemented as a fire sensor or as a non-fire sensor. Potential non-fire sensors include humidity sensors, dust sensors and velocity sensors.

FIG. 3 illustrates an exemplary block diagram of the present process and apparatus. It will be understood that the block diagram of FIG. 3 could be implemented in either hard-wired form or via the control program stored in the memory 14b which is in turn executed by the processor 14a. It could also be implemented at one or more of the respective detectors in hardware and/or software or both.

An output from sensor S1 can optionally first be pre-processed in element or step 28-1 (indicated in phantom in FIG. 3). The output from pre-processor 28-1, on line 30-1, is smoothed or filtered in module or step 32-1.

An output from sensor S2 can optionally first be pre-processed in element or step 28-2 (indicated in phantom in FIG. 3). The pre-processed output, on line 30-2, is in turn filtered or smoothed in element or step 32-2.

The outputs from the filtering processes A1(t) and A2(t) on lines 34-1 and 34-2, respectively, are then combined to produce a processed output function, on a line 38. The signal on line 38 is then an input to an alarm processing element or step 46. Inputs to the alarm processor 46 can include a plurality of thresholds 46a along with a plurality of slopes or gradients 46b.

The characteristics of the filtered signal on the line 38 can in turn be compared to one or more of the thresholds 46a and/or one or more of the slopes 46b by processor element or step 46. Alternately, more complex pattern recognition methods can be used.

In the event that an alarm condition is detected, a message can be displayed on the console 14b. Alternately, the alarm condition can be logged on the printer 14e. Further, the audible and alarm indicators 22 can be energized thereby alerting individuals in the region being supervised of the presence of the alarm condition.

It will be understood that neither the characteristics of the filters 32-1, 32-2, 36 nor the implementation thereof are limitations of the present invention. It will also be understood that a fire profile could appear on a transient basis. In this instance, the level of smoothing would be reduced or bypassed thereby decreasing the response time of the system 10. However, if the detected profile fades away or disappears, as would be the case of a transient smoke level, for example, the level of filtering or smoothing could again be increased restoring system 10 to its normal quiescent operating condition.

Alternately, in the event that the signal on the line 30-1 tends to return to a clear air level, indicative of the absence of a fire condition, the level of filtering or smoothing, for example, in the filters 32-1 and 32-2, 36 can be reduced or bypassed so as to enable the processed output signal on the line 38 to return to a corresponding filtered clear air value sooner than would otherwise be the case. In this instance, once the filtered signals return to their respective clear air values, the level of filtering can again be increased.

By way of further illustration of the characteristics and operation of the present apparatus and method, two examples will be discussed subsequently. Example 1 is directed toward performance characteristics of a detector, such as detector 18a wherein sensors S1 and S2 are both responsive to fire conditions. Subsequently, in Example 2, processing and response characteristics of another detector, such as detector 18b, which combines fire sensor S1 with a second non-fire sensor S2 will be described.

EXAMPLE NO. 1

A first fire sensor S1 is combined with a second fire sensor S2 where S2 controls the smoothing coefficient of S1. S1 will initially set its own smoothing coefficient based upon a fire signature profile from its own values as given below and is modified by S2:
S1 ONLY:

No indication sets the smoothing coefficient to 0.025 (very slow response). Slight indication sets the smoothing coefficient to 0.10 (slightly responsive). Moderate indication sets the smoothing coefficient to 0.15 (moderately responsive). Strong indication sets the smoothing coefficient to 0.25 (strongly responsive).
S2 MODIFICATION OF S1 SMOOTHING COEFFICIENT:

No indication only increases the smoothing coefficient by adding 0.025. Slight indication slightly increases the smoothing coefficient by adding 0.10. Moderate indication moderately increases the smoothing coefficient by adding 0.15. Strong indication strongly increases the smoothing coefficient by adding 0.25.

FIG. 4 illustrates the steps of processing for Example 1 wherein both sensors S1 and S2 are responsive to indicators of fire.

In a step 102, outputs from sensors S1 and S2 are obtained. In a step 104, the respective sensor outputs can be pre-processed, elements 28-1 and 28-2. In a plurality of steps 106, coefficient values are established based on the likelihood that the pre-processed signal S1', on line 30-1, is indicative of a fire condition. In a plurality of steps 108, a coefficient value established in steps 106 is modified in accordance with the likelihood of the pre-processed output from sensor S2, line 30-2, indicating a fire condition.

In a step 110, the pre-processed output S1' from sensor S1 is smoothed or filtered, element 32-1. In a step 112, the pre-processed output S2' of sensor S2 is smoothed or filtered, element 32-2.

In a step 114, a processed signal is formed, line 38, which is a result of combining filtered outputs on the line 34-1 and 34-2 associated with both sensors. The combining step is discussed subsequently.

In a step 116, the processed output, line 38, is then either compared to one or more thresholds 46a or a plurality of processed outputs received from line 38 are compared to predetermined slopes 46b, alarm processing element 46, to determine if an alarm condition is present. If so, an alarm is then generated.

FIG. 5A illustrates in graphical form outputs from sensors S1 and S2. Neither output is indicative of a fire. Processed output signal on line 38 fails to indicate the presence of an alarm condition.

FIG. 5B illustrates in graphic form the processed output signal on the line 38 where the output of sensor S1 is saturated in the absence of any fire indication from sensor S2. The sensor S1 output had not previously suggested a fire profile. It could have become saturated due to humidity, dust or a bug. If so, it may be a false indication.

As is illustrated in FIG. 5B, the line 38 signal increases linearly in response to the saturation condition of sensor S1 producing ultimately an alarm condition. Hence, the process tends to be fail safe.

FIG. 5C illustrates in graphic form the effect on the line 38 output signal where sensor S1 has saturated due to a slight indication of the presence of smoke and a strong indication of the presence of carbon monoxide received from sensor S2. As a result of the strong indication provided by sensor S2, the line 38 output signal reaches an alarm state faster than is the case in FIG. 5B. Hence, as a result of combining outputs from two different fire related sensors, an alarm condition can be indicated sooner than is the case with just a single sensor while still minimizing false alarms.

FIG. 5D illustrates in graphical form the positive benefits achieved by the present invention. There, a strong indication of fire from sensor S1 in combination with a strong indication from sensor S2 produces an output which goes into alarm relatively immediately as a result of the smoothing process having been adjusted by the output from sensor S2.

EXAMPLE NO. 2

A first, fire, sensor S1 is combined with a second, non-fire, sensor S2. Sensor S2 controls the smoothing coefficient of S1. Sensor S1 will initial set its own smoothing coefficient based upon fire signature profile from its own values as given below and is modified by S2 to reduce the response if a non-fire condition is detected:

S1 ONLY:

No indication sets the smoothing coefficient to 0.1 (slow response). Slight indication sets the smoothing coefficient to 0.25 (slight response). Moderate indication sets the smoothing coefficient to 1.0 (strong response).

S2 (non-fire) MODIFICATION OF S1 SMOOTHING COEFFICIENT:

No indication does not modify the smoothing coefficient. Slight indication divides the smoothing coefficient by 2 (less responsive). Moderate indication divides the smoothing coefficient by 5 (much less responsive). Strong indication divides the smoothing coefficient by 10 (very much less responsive).

FIG. 6 illustrates steps of a method 200 wherein a representative detector, such as a detector 18b includes a fire sensor S1 and a non-fire sensor S2. Steps of method 200 which are the same as respective steps of method 100 have been assigned the same identification numerals. Those steps do not need further discussion.

In a plurality of steps 206, the value of a smoothing or filtering coefficient is adjusted in accordance with the degree to which the pre-processed output S1' from the sensor S1 indicates a fire condition. In a plurality of steps 208, the value of the smoothing or filtering coefficient established in the steps 206 is adjusted in accordance with the degree to which the pre-processed output S2' from the sensor S2 is indicative of the respective non-fire condition. Subsequently, using the value established for the smoothing or filtering coefficient, the respective sensor outputs are smoothed, steps 110 and 112, combined in step 114, and then processed to determine if an alarm condition is present, step 116. It will be understood that different smoothing coefficients could be used with different type, of sensors.

FIG. 7A illustrates in graphical form the interaction between fire sensor S1 and humidity sensor S2 where a fire condition is being reported by sensor S1 but no fire condition is being reported by sensor S2. Conversely, the graphs of FIG. 7B illustrate the damping effect that sensor S2 has in the presence of a strong indication of the respective condition so as to minimize the likelihood of a false alarm being produced in a response to the signal from sensor S1.

With respect to the flow diagrams of FIGS. 4, 6, once the smoothing coefficient K has been determined, the sensor data sample values S1' and S2' can be smoothed. This process is dynamic and K may change with each new data sample. Recall that:

$$A1(t)=(1-K)*A1(t-1)+(K)*S1'$$

and $$A2(t)=(1-K)*A2(t-1)+(K)*S2'.$$

This method of determining K which is used for both sensors S1, S2 is not necessarily restricted. Different K values can be determined for each sensor [i.e. K1 for use in A1(t) and K2 for use in A2(t)].

For example, K2=(K1)/2 so A2(t) will have a slower response than A1(t). The relationship between K1 and K2 will be a function of the type of sensors involved and their response characteristics. To continue with the presently preferred method, K1=K2.

The processed individual sensor values A1(t) and A2(t) are now combined as in step 114 and used in an alarm determination routine, step 116 to arrive at a determination (Alarm or No Alarm). This function is expressed as:

$$F(t)=F[A1(t),A2(t)].$$

F(t) may equal A1(t)+A2(t) as a straight sum, or A1(t)^2+A2(t)^2 as sum of squares, or A1(t)+A2(t)/2 as a weighed sum, or other mathematical relationship, without limitation, between A1(t) an A2(t).

Also, for the purpose of this invention, the actual equation for A1(t) and A2(t) may vary and be within the scope of determining the smoothing coefficient(s) by using more than one sensor. The presently preferred method is to let F(t)=F (A1(t),0]=A1(t) where A2(t) is just used to determine the smoothing coefficient K. This is the method demonstrated in the response graphs.

$$F(t)=A1(t)=(1-K)*A1(t)+(K)*S1', \text{ step } 114.$$

If A1(t)>alarm threshold AT, THEN OUTPUT=ALARM, step 116.

It will be understood that, alternately, the output signal from sensor S2 can be used to directly alter one or more coefficients of the smoothing process for the output signal of the sensor SI. In this regard, some or all of the processing of the S1's output signal can be carried out locally at the respective detector. the partially or fully processed output signals, could be analyzed at the detector and/or at the control unit 14 for the presence of a fire condition.

Figure 8:
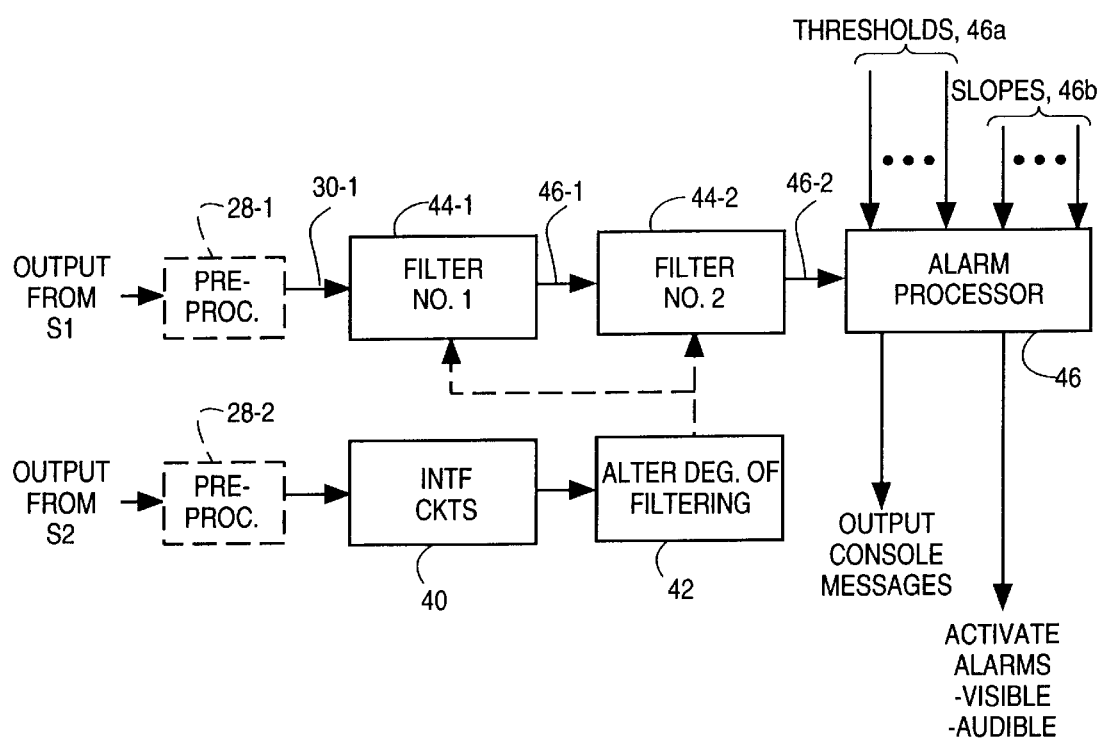
FIG. 8 is a block diagram of an alternate apparatus and method in accordance herewith.

FIG. 8 illustrates an apparatus and process wherein an output from sensor S2 has been pre-processed in element or in step 28-2. That output, coupled by interface circuits 40 to circuitry 42, is intended to alter one or more coefficients of a two-stage filter of signal S1', illustrated as exemplary only. A first filter section 44-1 with a filtered output on a line 46-1 is in turn coupled to a second filter section 44-2 which in turn generates an output on a line 46-2. The twice-filtered output on the line 46-2 can then be analyzed in the alarm processor 46.

It will be understood that some or all of the elements illustrated in FIG. 8 could be located within the respective detector. Alternately, alarm processor 46 could, for example, be located at common control element 14. In yet another alternate, filters 44-1, 44-2 and altering circuitry 42 could also be located at control element 14. It will be understood that neither the way in which filtering is implemented nor the way in which it is modified in response to output from another sensor are limitations of the present invention.

It will also be understood in such an instance that control circuits, such as 26c, located at the respective detector could be implemented using a programmed processor. Preloaded instructions associated with that processor could be used to carry out the pre-processing, elements 28-1, 28-2 as well as filtering functions such as filters 44-1 and 44-2.

Figure 9:
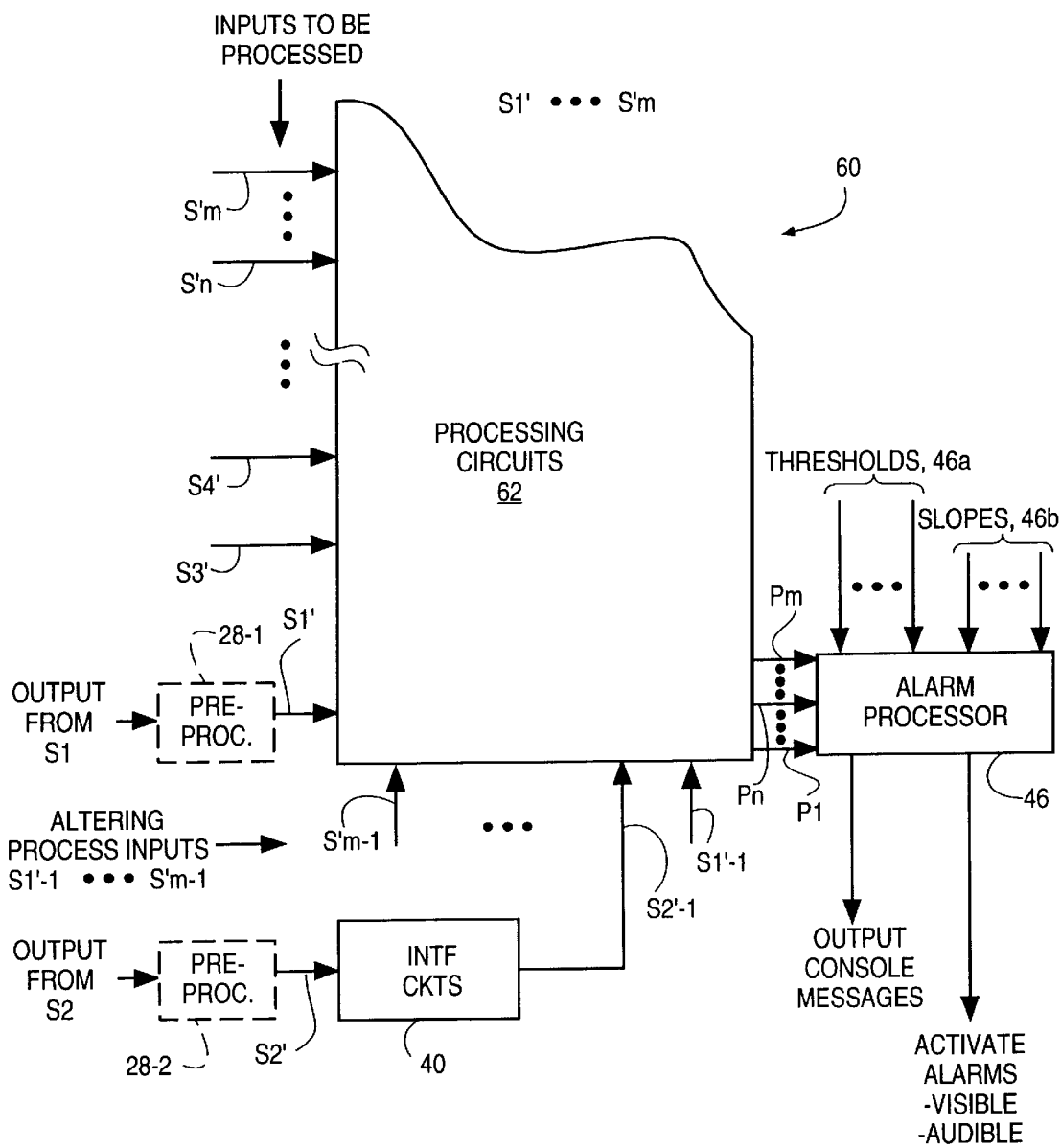
FIG. 9 is a block diagram of alternate embodiment of a system in accordance with the present invention.

FIG. 9 illustrates another embodiment in accordance herewith. An apparatus 60 incorporates a plurality of sensors S1, S2, . . . $S_n$. Outputs from the sensors could, for example, be preprocessed as in blocks 28-1, 28-2. These signals, such as S1', S2' could, if desired, be coupled via respective interface circuits 40 as sensor inputs to processing circuits 62. In addition, the signals S1'-1 . . . Sm'-1 from the respective sensors can be coupled to process altering inputs of the circuitry 62.

By way of example and not limitation, if the system 60 includes three sensors S1, S2, S3, any one of the outputs from a respective sensor, S1' . . . S3' can be processed in circuitry 62. In response to the signals from others of the sensors S1'-1, S2'-1, and S3'-1, the form and extent of processing in circuitry 62 can be altered with respect to each of the input signals. Processed outputs P1, P2, P3 can be transmitted to the alarm processor 46 for subsequent determination as to the presence of one or more alarm related conditions.

In the apparatus 60, an output signal from one or more sensors is used to control processing of an output signal from one or more other sensors. Examples include altering a degree of filtering or smoothing irrespective of whether those processes are implemented by software or hardware. In this regard, the response rate of a processed representation of an output signal from a first sensor is adjusted or limited by the output of the second sensor.

In a preferred embodiment, on a periodic basis, the sensors are sampled. The second sensor is used to control the smoothing of the first sensor. This smoothing can be accomplished by using a smoothing coefficient or by other means that limit the amount of change or rate of change in the processed output of the first sensor. The response rate of the first sensor is thus adjusted by the second sensor.

The response of the first sensor could be made faster if the output of the second sensor is indicative of a condition in the environment to be detected. This response of the first sensor could be made slower, rather than faster, if the output of the second sensor detects a false or negative condition in the environment.

If the second sensor is a thermal sensor, then a positive indication of a fire condition could be indicated by increasing signals and a negative indication could be indicated by decreasing signals. The second sensor might be a CO2, CO, or other type of gas sensor that produces a positive signal in the presence of the environmental condition to be detected. In this case, a positive indication for a fire condition could be reflected by an increasing signal over time. A negative condition could be reflected by a decreasing signal over time.

If the second sensor is a humidity sensor, then the positive indication of a fire condition could correspond to a small increase in the signals and a negative indication of a fire condition could correspond to a large increase in signals. If the second sensor is a dust sensor, then a positive indication of a fire could correspond to no change in output and a negative indication of a fire could be a positive increase in the output signal.

The second sensor could be the same type as the first sensor or a different type. The number, type, quantity, or combination of sensors, do not limit the scope of the invention. In addition, the direction of change in the sensor signals could be dependent upon the construction of the sensor and associated circuitry. An important issue is the "indication" of a positive or negative environmental condition correlated to the desired environmental condition to be detected.

An alarm can be determined in different ways such as:

1) the smoothed output can be compared to a threshold;
2) the smoothed rate of change of the signals can be compared to a threshold,
3) the rate of change of the smoothed signals can be compared to a predetermined threshold; or
4) the smoothed profiles of the sensor signals can be compared to predetermined profiles.

Smoothing can be applied to either the raw output signals or to a calculation of the rate of change of the raw sensor output signals or using some other processing method. A combination where smoothing is used to process a sensor's output and that smoothing can be adjusted by another sensor, falls within the scope of this invention. The smoothing method associated with the first sensor is adjusted as a function of the response of the second sensor.

As an example, a processed response of the first sensor could be adjusted to 1) a moderate rate if there is no positive indications from a second sensor, or 2) a fast rate if there is a positive indication from a second sensor, or 3) a very slow rate if there is a negative indication from a second sensor.

Again, the response characteristic of the sensor that is smoothed may be the rate of change in the response of the sensor. The response is defined as the characteristic of the sensor signals that is used to determine an alarm condition.

If a smoothing coefficient is used with an exponential smoothing equation, then the amount of change in the processed output of the first sensor will be a direct function of the choice of the smoothing coefficient:

$$\mathrm{OUT}=\mathrm{OUT}*(A)+\mathrm{SAMPLE}*(1-A)$$

where A has a value between 0 and 1.

If A is large, then small fractions of the SAMPLE are added to the previous output to obtain the new output. This makes OUT respond slowly to the new SAMPLE values. On the other hand, if A is small, then large fractions of the SAMPLE are added to the previous output and OUT responds quickly to the new SAMPLE values.

Another exemplary method of smoothing utilizes averaging of sensor values. If the second sensor is not responding to the environment, then a large average, (many samples) is used with the fist sensor (i.e. an average of 30 samples) and it will respond slowly. On the other hand, if a second sensor is responding and indicative of an environmental condition to which the first sensor is also responding, then the amount of averaging (number of samples) is reduced significantly.

The degree of reduction in smoothing could be an amount proportional to the amount of response of the second sensor, or, a step change from slow to fast, depending upon the desired response characteristics. For example, if the first sensor processed OUT was the result of an average of 30 samples with no response indicated by the second sensor, then the average could be reduced to:

1) 20 samples if the second sensor is mildly responding,
2) 10 samples if the second sensor is moderately responding, and 3) 5 samples if the second sensor is strongly responding.

Other functions, such as linear or non-linear equations, could be used. What is required is that the amount of averaging of the first sensor is a function of the response of the second sensor. As the degree of averaging is reduced, the response is faster for the first sensor.

Another example of a smoothing method is to clamp the response of the first sensor to discrete increments and to vary the size of the increments as a function of the response of the second sensor. When there is no response from the second sensor, the amount of the discrete incremental change of the first sensor is very small. As the response of the second sensor starts being indicative of the environmental condition, the amount of the discrete incremental change of the first sensor is increased, making it faster responding.

Figure 10:
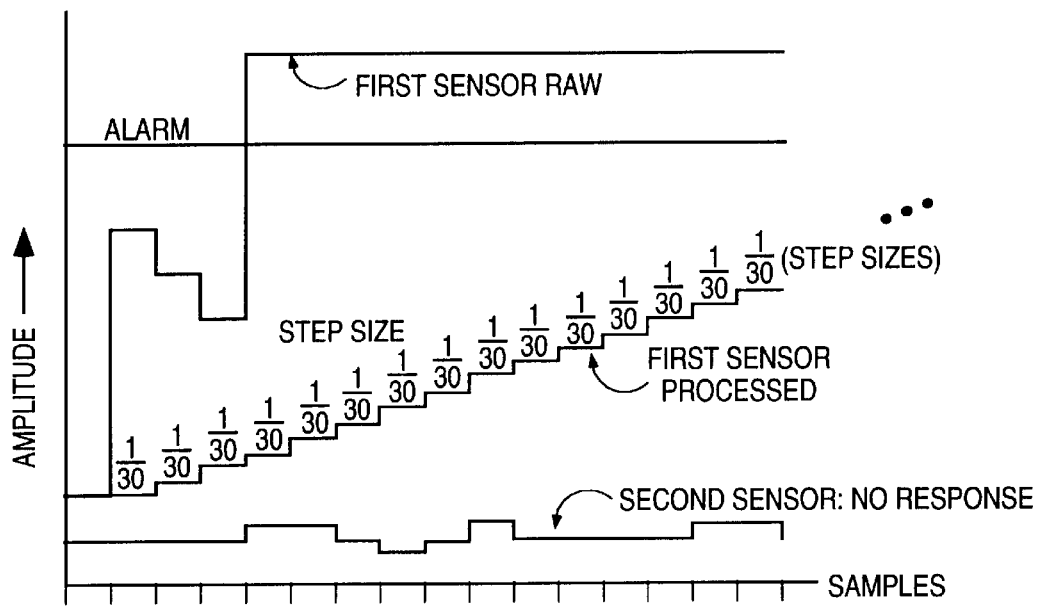
FIG. 10 is a graph illustrating exemplary operation of a two-sensor incremental amplitude limiting form of processing wherein the process altering input is substantially flat.
Figure 11:
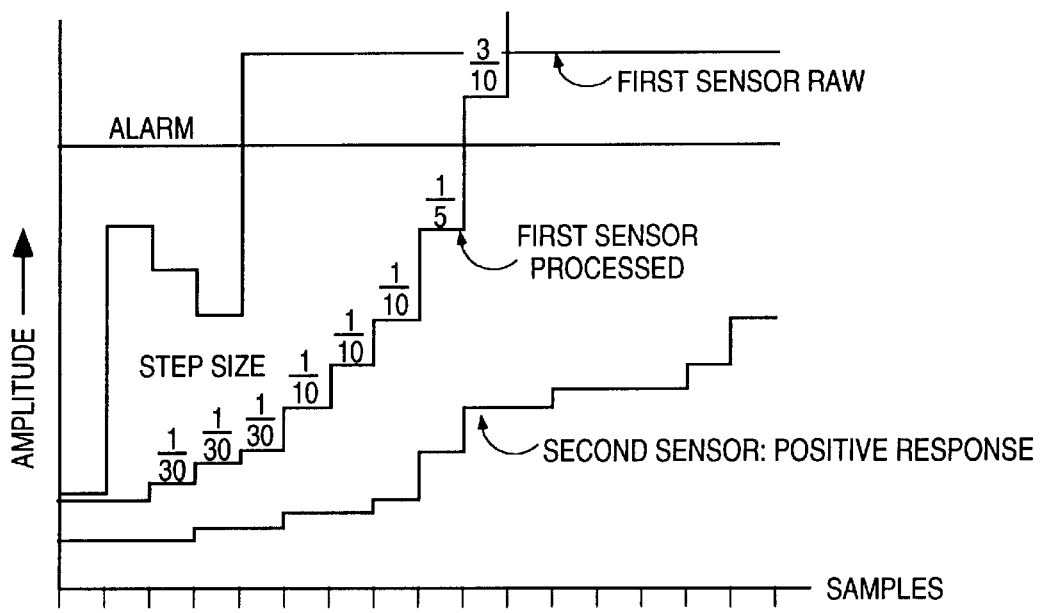
FIG. 11 is a graph of the same type of system illustrated in the graph of FIG. 10 where the process altering input is increasing.

FIGS. 10 and 11 illustrate the response of the first sensor using this method. In FIG. 10, the second sensor is not responding. Hence, the variation of the processed output from the first sensor response is clamped to 1/30 of the alarm level for each sample. The first sensor will take 30 samples to reach the alarm threshold. This should be sufficient for a transient nuisance condition (not the environmental condition preferred to be detected) to dissipate or clear from the sensor. A warning could be issued prior to an alarm so that an operator could investigate and prevent an unwanted alarm.

FIG. 11 illustrates an example where the second sensor is responding to a condition. The discrete increments become larger as the second sensor's response increases. The first sensor changes from slowly responding (1/30 of alarm level per step) to fast responding (3/10 of alarm level per step).

As would be understood by those of skill in the art, the amount of clamping of the response of the first sensor as a function of the amount of response of the second sensor could be represented by a linear or non-linear equation or relationship. The degree of clamping of the first sensor per sample could also be continuous rather than discrete.

Likewise, other smoothing methods are also applicable and fall within the scope of the invention. In addition, various functions can be used to control the smoothing of the first sensor according to the response of the second sensor. These vary from a simple step function (if the second sensor is responding to a predetermined threshold, then the smoothing is completely removed on the first sensor) to a complex relationship that could even involve exponents.

It is also within the scope of this invention, that the degree of change or smoothing in the first sensor can affect the smoothing of the second sensor. In this way, the response of either sensor is a function of the response of the other sensor.

If the second sensor still controls the smoothing response of the first sensor, there is a continual adjustment of each sensor and a feedback mechanism between the sensor top obtain the fastest response possible. If both sensors are responding, then the smoothing of each sensor is reduced. This then causes smoothing of each sensor to be further reduced. The sensor values could then be combined to determine an alarm condition or a single sensor used for the alarm determination.

If the processed outputs from the sensors are combined to determine an alarm condition, they can be 1) combined such that they are summed to together and that sum compared to a predetermined threshold or 2) they can be combined by raising each sensor value to an exponential value and then summing, or 3) they can be combined in other ways.

The method of combining the sensors to determine an alarm is not a limitation of the present invention. Where the smoothing of either sensor is a function of the response of another sensor, prior to the combining of the sensors, various ways can be used to determine the presence of an alarm condition without departing form the spirit and scope hereof.

If more than two sensors are used, then the adjustment of the smoothing of one sensor may be a function of the response of the other sensors: SMOOTHING of sensor1= FUNCTION(sensor2, sensor3, etc.). For example, if sensor2 is responding and sensor3 is responding to the environmental condition, then the smoothing of sensor1 could be completely removed. Alternatively, if either or both of sensor2 or sensor3 are detecting a false condition, not indicative of the desired environmental condition, then the smoothing of sensor1 could be further reduced.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. An apparatus comprising:

a first sensor which produces a first output in response to a first ambient condition;

at least a second sensor which produces a second output in response to a second ambient condition;

processing circuitry, coupled to at least the first and second sensors, responsive to the first output to form a processed output, representative of at least the value of the first output, wherein the second output varies the way in which the processed output is formed from the first output; and wherein the processing circuitry includes smoothing circuitry having an input port for the first output, a variable smoothing input port coupled to the second output and a processed signal output port whereby the processed signal corresponds to a smoothed representation of the first output.

2. An apparatus comprising:

a first sensor which produces a first output in response to a first ambient condition;

at least a second sensor which produces a second output in response to a second ambient condition;

smoothing circuitry, coupled to at least the first and second sensors, responsive to the first output to form a smoothed output, representative of at least a value of the first output, wherein the second output varies the way in which the smoothed output is formed from the first output; and wherein processing circuitry includes rate altering circuitry, responsive to the second output, for altering a response rate of the smoothed output relative to the first output.

3. An apparatus as in claim 2 wherein the rate altering circuitry comprises an adjustable filter wherein the characteristics of the filter are varied by the second output.

4. An apparatus as in claim 2 wherein the rate altering circuitry comprises an amplitude variation limiting circuit wherein amplitude variations of the processed output are limited by the second output.

5. An apparatus as in claim 4 wherein the limiting circuit imposes a maximum incremental variation on the processed output in response to the second output.

6. An apparatus as in claim 2 wherein the rate altering circuitry comprises circuitry for limiting a rate of change of the processed output.

7. An apparatus as in claim 6 wherein the limiting circuitry imposes a maximum rate of change limitation on the processed output in response to the second output.

8. An apparatus as in claim 6 wherein the limiting circuitry imposes an incremental maximum amplitude change in the processed output in response to the second output.

9. An apparatus comprising:
a first sensor which produces a first output in response to a first ambient condition;
at least a second sensor which produces a second output in response to a second ambient condition;
processing circuitry, coupled to at least the first and second sensors, responsive to the first output to form a processed output, representative of at least the value of the first output, wherein the second output varies the way in which the processed output is formed from the first output; and
wherein the processing circuitry forms an average of a representation of the first output as the processed output and wherein the second output varies the way in which the average is formed.

10. An apparatus as in claim 9 wherein the processing circuitry, in response to the second output, varies a number of values used to form the average.

11. An apparatus as in claim 10 wherein the values being averaged comprise amplitude values of the first output.

12. An apparatus comprising:
a first sensor which produces a first output in response to a first ambient condition;
at least a second sensor which produces a second output in response to a second ambient condition;
processing circuitry, coupled to at least the first and second sensors, responsive to the first output to form a processed output, representative of at least the value of the first output, wherein the second output varies the way in which the processed output is formed from the first output; and
which includes a third sensor which produces a third output, wherein the processing circuitry is coupled to the third sensor and wherein the second and third outputs vary the way in which the processed output is formed from the first output.

13. An apparatus as in claim 12 wherein the processing circuitry is responsive to the second output to form a second processed output and wherein at least the first output varies the way in which the second processed output is formed.

14. An apparatus as in claim 13 wherein at least the first and third outputs vary the way in which the second processed output is formed.

15. Am ambient condition system comprising:
a plurality of signal generating ambient condition sensors;
processing circuitry coupled to the sensors wherein the circuitry smoothes at least some of the signals, thereby producing smoothed output signals wherein a respective degree of smoothing of at least one signal is altered by at least one other signal from a different sensor.

16. A system as in claim 15 wherein the smoothing comprises limiting a rate of change of at least one smoothed signal to preselected incremental values.

17. A system as in claim 15 wherein a plurality of signals from a plurality of sensors alters a respective degree of smoothing of at least one signal.

18. An apparatus comprising:
a first sensor of a first ambient condition wherein the sensor generates a first output indicative of the first condition;
a second sensor of a second ambient condition wherein the sensor generates a second output indicative of the second condition; and
a control element which receives signals indicative of the outputs of both sensors wherein the control element includes circuitry for smoothing the first output thereby producing a smoothed first output signal, in response to the second output; and
wherein the control element includes a programmed computer and a set of instructions which, when executed by the programmed computer produce the processed first output signal.

19. An apparatus as in claim 18 wherein the first sensor comprises a smoke sensor and the second sensor comprises a gas sensor.

20. An apparatus as in claim 18 wherein the first sensor comprises a fire sensor selected from a class which includes a smoke sensor, a thermal sensor and a gas sensor and wherein the second sensor comprises a non-fire sensor.

21. An apparatus as in claim 18 which includes a housing, wherein the sensors are carried by the housing.

22. An apparatus as in claim 21 wherein at least a portion of the control element, comprising local control circuitry, is carried by the housing.

23. An apparatus as in claim 22 wherein the control circuitry carries out a filtering process at the housing and includes circuitry, responsive to the output of the second sensor, for modifying at least one coefficient thereof.

24. An apparatus as in claim 22 wherein the circuitry for processing includes signal circuitry for step-wise limiting amplitude variations of the processed first output wherein the second output establishes an incremental maximum amplitude variation of the processed first output signal.

25. An apparatus as in claim 24 wherein the circuitry for processing responds to an increase of the second ambient condition by providing a greater incremental variation of the processed first output signal than when the second condition is not increasing.

26. An apparatus comprising:
a first sensor of a first ambient condition wherein the sensor generates a first output indicative of the first condition;
a second sensor of a second ambient condition wherein the sensor generates a second output indicative of the second condition; and
at least a third sensor of at least a third ambient condition wherein the third sensor generates a third output indicative of the third condition; and
a control element which receives signals indicative of the outputs of the sensors wherein the control element includes circuitry for at least adjusting a filtering process associated with the first sensor thereby producing a processed first output, in response to the other sensor outputs.

27. An apparatus as in claim 26 wherein the filtering process comprises clamping an incremental change in the processed first output to predetermined, alterable values.

28. An apparatus as in claim 26 wherein the filtering process comprises forming running averages of the filtered sensor signals and the degree of filtering of the sensor signals is alterable.

29. An apparatus as in claim 26 wherein the filtering process comprises forming running averages of the sensor signals and wherein the size of the running average is alterable.

30. An apparatus as in claim 26 wherein the filtering process includes exponential-type processing which uses a smoothing coefficient.

31. An apparatus as in claim 26 wherein the first and second sensors are of the same type.

32. A fire detection apparatus comprising:
  a smoke sensor wherein the sensor generates a first output signal indicative of sensed smoke;
  a gas sensor wherein the sensor generates a second output signal indicative of sensed gas;
  a control element which receives signals indicative of the outputs of both sensors wherein the control element includes circuitry for processing the first output signal thereby producing a processed first output signal, in response to the second output signal; and
  circuitry, responsive to the processed first output signal, for determining if a fire has been detected.

33. An apparatus as in claim 32 wherein the control element includes a programmed computer and a set of instructions which, when executed by the programmed computer produce the processed first output signal.

34. An apparatus as in claim 32 wherein the circuitry for determining is displaced from at least one of the sensors.

35. An apparatus as in claim 33 which includes a housing, wherein the sensors are carried by the housing.

36. An apparatus as in claim 35 wherein at least a portion of the control element, comprising local control circuitry, is carried by the housing.

37. An apparatus as in claim 35 wherein the control circuitry carries out a filtering process at the housing and includes circuitry, responsive to the output of the second sensor, for modifying at least one coefficient thereof.

38. An apparatus as in claim 35 wherein the circuitry for processing includes circuitry for step-wise limiting amplitude variations of the processed first output wherein the second output establishes an incremental maximum amplitude variation of the processed first output signal.

39. An apparatus as in claim 38 wherein the circuitry for processing responds to an increase of the sensed gas by providing a greater incremental variation of the processed first output signal than when the sensed gas is not increasing.

40. An apparatus as in claim 32 comprising:
  at least a third sensor of at least a third ambient condition wherein the third sensor generates a third output indicative of the third condition; and wherein the control element receives signals indicative of the outputs of all of the sensors, wherein the control element includes circuitry for at least adjusting a filtering process associated with the smoke sensor thereby producing a processed first output, in response to the other sensor outputs.

41. An apparatus as in claim 40 wherein the filtering process comprises clamping an incremental change in the processed first output to selected, alterable values.

42. An apparatus as in claim 40 wherein the filtering process comprises one of forming running averages of the filtered sensor signals wherein the degree of filtering of the sensor signals is alterable and forming running averages of the sensor signals wherein the size of the respective running average is alterable.

43. An apparatus as in claim 40 wherein the filtering process includes exponential-type processing which uses a smoothing coefficient.

44. A method of processing in a fire detection apparatus comprising:
  detecting a first output signal from a fire sensor;
  detecting a second output signal from a gas sensor;
  variably smoothing the first output signal, wherein the second output signal alters a degree of smoothing thereof, thereby forming the processed first output signal; and
  determining if a fire profile has been detected.

45. A method as in claim 44 wherein the smoothing step comprises limiting an incremental change in the processed first output signal to selected, alterable values.

46. A method of processing in a fire detection apparatus:
  detecting a first output signal from a smoke sensor;
  detecting a second output signal from a gas sensor;
  detecting a third output signal from a third sensor;
  variably smoothing the first output signal, wherein the second and third output signals alter a degree of smoothing thereof, thereby forming the processed first output signal.

* * * * *